United States Patent [19]

Bruen et al.

[11] 3,925,538
[45] Dec. 9, 1975

[54] PROCESS FOR PRODUCING ALUMINA MONOHYDRATE FROM BASIC ALUMINUM NITRATES

[75] Inventors: Charles P. Bruen, Basking Ridge; Donald H. Kelly, Gladstone, both of N.J.

[73] Assignee: Reynolds Metals Company, Richmond, Va.

[22] Filed: Nov. 6, 1974

[21] Appl. No.: 521,381

Related U.S. Application Data

[62] Division of Ser. No. 48,919, June 18, 1970, Pat. No. 3,864,462.

[52] U.S. Cl. ............... 423/390; 423/395; 423/400; 423/631
[51] Int. Cl.² ....................... C01B 21/42; C01F 7/30
[58] Field of Search ............ 423/631, 390, 395, 400

[56] References Cited
UNITED STATES PATENTS

| | | | |
|---|---|---|---|
| 1,792,410 | 2/1931 | Buchner | 423/123 |
| 2,196,016 | 4/1940 | Huehn et al. | 423/495 |
| 2,915,475 | 12/1959 | Bugosh | 252/313 |
| 3,056,747 | 10/1962 | Arthur, Jr. | 264/87 |
| 3,366,446 | 1/1968 | Kelly et al. | 423/390 |
| 3,387,921 | 6/1968 | Amano et al. | 11/400 |

*Primary Examiner*—Herbert T. Carter

[57] ABSTRACT

Process for producing alumina monohydrate and aluminum nitrate from basic aluminum nitrates by preparing an aqueous solution of the basic aluminum nitrate having a nitrate concentration low enough to prevent solution of $Al_2O_3$, heating the solution under autogenous pressure to convert the free alumina in the basic aluminum nitrate to solid alumina monohydrate, and recovering the solid alumina monohydrate.

1 Claim, No Drawings

PROCESS FOR PRODUCING ALUMINA MONOHYDRATE FROM BASIC ALUMINUM NITRATES

This is a division of application Ser. No. 48,919 filed June 18, 1970, now U.S. Pat. No. 3,864,462.

This invention relates to a process for the production of alumina monohydrate from basic aluminum nitrates.

It is known to produce anhydrous alumina by a multistage process which involves the nitric acid digestion of aluminous ores followed by crystallization of the resulting aluminum nitrate as the nonahydrate $Al(NO_3)_3.9H_2O$, and decomposition and denitrification of the aluminum nitrate nonahydrate to alumina and nitric acid by the application of heat.

Denitrification of aluminum nitrate nonahydrate has been carried out in the past by direct application of heat at atmospheric pressure to aluminum nitrate nonahydrate crystals, which melt at 73.5°C. and boil at 135°C. with decomposition. In such atmospheric denitrification processes, decomposition can be continued with agitation of the melt until about 50% of the $N_2O_5$ in the melt has been removed, together with water vapor from the crystals, and recovered as nitric acid ($HNO_3$), of about 50% concentration. The remaining melt has a boiling point of about 148°C. and such a high viscosity (ca 10,000 centipoises or higher) that agitation becomes difficult or impracticable, resulting in clinging of the melt to the walls of the container, and local overheating of the melt which further complicates denitrification. Moreover, when the melt is cooled, it is a sticky, gummy, mass with a softening point of about 123°C. which resists further denitrification, since several hours heating at 110°C. are required to remove as little as 1% of the remaining nitric acid values.

In U.S. Pat. No. 3,366,446 of Donald H. Kelly and Anthony W. Yodis, granted Jan. 30, 1968, there is described a process for denitrification of aluminum nitrate nonahydrate which avoids the formation of a gummy mass and permits more complete denitrification than does the prior process. The Kelly et al. process involves the decomposition of aluminum nitrate nonahydrate by melting the aluminum nitrate nonahydrate, heating the molten aluminum nitrate nonahydrate to a temperature above its decomposition temperature but not above 230°C., under superatmospheric pressure of at least about 25 psig and sufficient to maintain said decomposition temperature while removing gaseous nitric acid decomposition products until between about 45 and about 55% of the $HNO_3$ of the aluminum nitrate nonahydrate has been removed, followed by "flashing" i.e. reducing the pressure quickly to atmospheric, to produce a molten residue which, on cooling, becomes a friable solid, cooling the molten residue to a temperature below its softening point, holding the solid melt below the softening temperature of the melt for one-half hour or more, thus producing a friable non-melting solid, and further heating the nonmelting solid to decompose it into $N_2O_5$ and solid $Al_2O_3$.

The denitrification process of the above Kelly et al. patent thus provides marked advantages over the prior art, especially in the production of friable, non-melting solids which are readily handled, instead of the gummy products of the prior art, and permits greater nitric acid recovery. It was found, however, that in the Kelly et al. process, at the temperatures required to break down the non-melting solid into the alumina and nitric acid values, substantial proportions of undesired gaseous oxides of nitrogen, NO and $NO_2$, are formed along with the desired normally liquid $N_2O_5$. The gaseous nitrogen oxides are troublesome since they do not dissolve in water; they do not form nitric acid directly as does $N_2O_5$, and they must be oxidized in a separate converter in order to recover them as nitric acid.

It is an object of the present invention to provide a process for the production of alumina monohydrate in which virtually no lower oxides of nitrogen are produced.

Another object of the invention is to provide an alumina recovery process wherein $Al_2O_3$ values are produced in non-dusting readily recoverable particle size.

A still further object is to provide a process for producing alumina from basic aluminum nitrates, wherein virtually no troublesome gaseous oxides of nitrogen are produced.

These and other objects are accomplished according to our invention wherein basic aluminum nitrates such as those prepared by the partial denitrification of aluminum nitrate nonahydrate to a point where the basic aluminum nitrates have a combined nitrate content between about 25 and about 75% of that combined in normal aluminum nitrate $Al(NO_3)_3$, are subjected to hydrothermal decomposition to alumina monohydrate $Al_2O_3.H_2O$ and aluminum nitrate by heating the basic aluminum nitrates in the presence of an excess of water sufficient to provide a concentration of combined nitrates, in solution, too low to dissolve substantial proportions of free $Al_2O_3$, preferably not more than about 25% nitrates by weight (calculated as $NO_3$), to a temperature of at least about 180°C. under autogenous pressure for a period sufficient to convert substantially all of the free $Al_2O_3$ in the basic aluminum nitrate to solid alumina monohydrate, and recovering the solid alumina monohydrate thus produced. By free alumina is meant that portion of the aluminum not bound by the nitrate radical and calculated as $Al_2O_3$.

In carrying out the process according to our invention, aqueous aluminum nitrate, existing either as the nonahydrate $Al(NO_3)_3.9H_2O$ or greater aqueous dilutions thereof, is partially denitrified to remove between about 25% and about 75% of the nitric acid values, by any suitable means, for example by heating to boiling under atmospheric pressure, or, preferably, by digestion under pressure as described in U.S. Pat. No. 3,366,446.

The partially denitrified product is a mixture of basic aluminum nitrates containing substantial proportions of a dibasic aluminum nitrate of the formula Ia. $Al(OH)_2NO_3$ which may also be viewed as Ib. $Al_2O_3.Al(NO_3)_3.3H_2O$ We have identified compound Ia by X-ray diffraction as identical with that described in Table XI, page 32, of IDO 14,574 Quarterly report for 3rd quarter 1961 of the Idaho operations office, U.S. Atomic Energy Commission. The partially denitrified product also contains one or more other basic aluminum nitrates of unidentified composition, possibly including the monobasic aluminum nitrate IIa. $Al(OH)(NO_3)_3$ which may also be viewed as IIb. $Al_2O_3.4Al(NO_3)_3.3H_2O$ Proportions of the different aluminum nitrates vary depending on degree of denitrification. We carry this denitrification to between about 75 and about 25% of completion, thus producing basic aluminum nitrates containing between about 25 and about 75% the proportion of bound nitrates contained in normal aluminum nitrate Al(NO$_3$)$_3$. Thus the basic aluminum nitrate starting materials of our invention can be viewed as having the empirical formula shown below expressed in terms of its "free" alumina content as IIIa. Al$_2$O$_3$.xAl(NO$_3$)$_3$.yH$_2$O wherein $x$ is a numeral from 0.667 to 6.0 inclusive, $y$ is a numeral from 4 to 38 inclusive.

Expressed in terms of alumina, N$_2$O$_5$ and water this formula becomes:

IIIb. Al$_2$O$_3$.pN$_2$O$_5$.zH$_2$O wherein p is a numeral ranging from 0.75 to 2.25 inclusive, z is a numeral ranging from 3.0 to 9.5 inclusive.

At 50% denitrification the empirical formula of the basic nitrates can be written as IVa. Al$_2$O$_3$.2Al(NO$_3$)$_3$.12H$_2$O or IVb. Al$_2$O$_3$.1.5N$_2$O$_5$.6H$_2$O Formula Ib shows that the dibasic aluminum nitrate contains one mole of free alumina, Al$_2$O$_3$, for every mole of bound aluminum, Al(NO$_3$)$_3$; formula IIb shows that the hypothetical monobasic aluminum nitrate contains one mole of free alumina for every 4 moles of bound aluminum. The mixtures of basic aluminum nitrates as shown in empirical formula IIIa have between about 0.667 and 6.0 moles of bound aluminum per mole of free alumina.

The degree of denitrification of the basic aluminum nitrate starting material of our invention may vary, but preferably should have at least about 25% of the N$_2$O$_5$ of the starting Al(NO$_3$)$_3$ removed, i.e. the mass should contain no more than about 75% the amount of bound nitrates compared to the amount in normal aluminum nitrate Al(NO$_3$)$_3$, preferably between about 75 and about 25%. Degrees of denitrification lower than about 25% are unsatisfactory as the alumina remains in solution in the aluminum nitrate. Aluminum nitrate charges which have been denitrified to the extent of about 25% and higher produce a solid precipitate and when heated according to our invention give excellent yields of alumina. Those charges which have been denitrified to at least about 40 yield about 100% the recoverable alumina. On the other hand, we find it uneconomical to carry the denitrification beyond about 75% denitrified, since at denitrifications above this value, substantial proportions of the nitrate values are decomposed into unwanted gaseous lower oxides of nitrogen, NO and NO$_2$. We therefore prefer to use denitrified charges from which between about 25 and about 75% of the N$_2$O$_5$ has been recovered, i.e. which contain chemically bound nitrates in proportions between about 75 and about 25% of the nitrates in normal aluminum nitrate, Al(NO$_3$)$_3$.

In practicing our invention, the partially denitrified product described above, is diluted with a quantity of water sufficient to produce a medium having an aluminum nitrate concentration too low to dissolve appreciable quantities of Al$_2$O$_3$. Thus we provide a medium containing not more than about 25% by weight of combined nitrates calculated as NO$_3$, based on the total weight of the solution, remaining in the denitrified liquor, preferably between about 20% and about 10% combined nitrates. Since we have found that both the basic aluminum nitrates and free Al$_2$O$_3$ are soluble in aqueous aluminum nitrate solutions of concentrations above about 25% of combined nitrates (calculated as NO$_3$), dilutions to below this concentration are essential. Dilutions to below about 10% nitrate concentrations are not harmful from the point of view of Al$_2$O$_3$.H$_2$O precipitation, but are undesirable in that they unduly dilute the mother liquor and increase the amount of evaporation necessary when this liquor is recycled.

Appropriate dilutions for 10% and 25% combined nitrate solutions, based on molar relationships, require the addition to the denitrified product of the amounts of water per mole of NO$_3$ in the denitrified product shown in the table below.

TABLE I

| Basic Aluminum Nitrate Product | Moles of H$_2$O Per Mole of NO$_3$ Required to be Added | |
|---|---|---|
| | For 25% HNO$_3$ Solution | For 10% HNO$_3$ Solution |
| 45% denitrified | 7.2 | 28.2 |
| 50% denitrified | 7.7 | 28.3 |
| 60% denitrified | 7.15 | 28.1 |

For intermediate NO$_3$ concentrations between 25 and 10%, intermediate amounts of water will be required. It is apparent from the above Table I that the molar ratios of water to combined NO$_3$ present, required to obtain a predetermined dilution is virtually constant regardless of the extent of denitrification. Thus as clearly indicated in the table, suitable dilutions will range between about 7.2 moles and about 28.2 moles of water per mole of bound NO$_3$ (14.4 moles to 56.4 moles per mole of N$_2$O$_5$).

The diluted basic aluminum nitrate is then heated under autogenous pressure to at least about 180°C., for a sufficient time to break down the basic aluminum nitrate substantially completely and to cause precipitation of virtually all the free alumina as alumina monohydrate Al$_2$O$_3$.H$_2$O, virtually devoid of any nitrate.

Temperatures during the above hydrothermal digestion step are critical and should be at least high enough to effect substantially complete dissociation or "disproportionation" of the basic aluminum nitrate of the starting product to alumina monohydrate and aluminum nitrate, to avoid inclusion in the precipitate of any nitrogen radicals which would be released as lower nitrogen oxides in the eventual calcination of the alumina monohydrate to alumina. Temperatures of at least about 180°C., as between about 180°C. and about 235°C., are satisfactory; temperatures between about 190°C. and about 210°C. are preferred. Temperatures lower than about 180°C. tend to promote the precipitation of the basic nitrates. Temperatures of 180°C. or higher tend to inhibit basic nitrate precipitation. Time of heating will depend somewhat on the temperature employed; lower temperatures requiring somewhat longer heating times than higher temperatures. Usually heating periods of at least about one-half hour are required, and heating periods between about 1.5 hours and about 5 hours at the preferred temperatures are usually sufficient to produce substantially complete dissociation of the basic aluminum nitrates. Upon heating at 160°C. for a period of about 3 hours a precipitate is obtained which may contain as much as 25% or more by weight of nitrates calculated as NO$_3$. Thus this temperature is too low for successful operation. Upon heating at 190°C. for the same period the residual nitrate is only about 10% whereas at 200°C. only about 2.5% of nitrates appear. At about 210°C. the residual nitrates may be as low as about 1.5%. These low amounts of nitrate are volatilized on final calcining as NO and NO$_2$.

Proportions of residual nitrates of 10% or below, present no operating difficulties and represent a nitric acid loss of only small percentages, i.e., no more than about 3% of the total nitric acid values in the basic aluminum nitrates or about 1.5% of the total $HNO_3$ values in the normal aluminum nitrate. Temperatures higher than 210°C., for example up to about 235°C. or higher while operationally satisfactory, are unnecessary for adequate suppression of nitrate precipitation, and present problems attendant on the higher pressures produced at these temperatures.

Time of heating the diluted solution is not unduly critical but should be sufficient to insure complete breakdown of the basic aluminum nitrates; usually a period between about one-half hour and about 5 hours will be sufficient.

The mechanism of the breakdown or "disproportionation" of the basic aluminum nitrate to alumina monohydrate is not entirely understood but is believed to proceed as shown in one or both of the equations set out below.

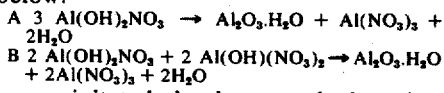

The precipitated alumina monohydrate is recovered as by filtration or other suitable means, and may then be calcined to anhydrous alumina by heating at temperatures of about 350°C. and above.

The undenitrified aluminum nitrate remains dissolved in the mother liquor and is suitably recycled to a succeeding aluminum nitrate denitrification step. Thus in commercial operation a steady state is established wherein recovery of both alumina and nitric acid values are high. Impurities which build up in the aluminum nitrate mother liquor do not appear to contaminate the precipitated alumina monohydrate until their concentrations have reached surprisingly high proportions. At this stage in a continuous operation sufficient quantities of mother liquor can be bled off to insure maintenance of impurity composition below a level which would be harmful to the precipitated alumina monohydrate.

Our discovery that the breakdown of basic aluminum nitrates can be made to occur, and the provision of conditions under which the alumina monohydrate will precipitate, leaving virtually all the normal nitrates in solution, is new and surprising and is based on the discovery of the critical conditions, especially those of temperature and degree of dilution which provide this surprising freedom from contaminating nitrates.

The alumina monohydrate precipitated in our hydrothermal process is generally a very pure crystalline $Al_2O_3 \cdot H_2O$, sometimes known as Boehmite, and exhibits the characteristic X-ray diffraction pattern for this substance.

The precipitated alumina monohydrate crystals formed by direct precipitation in the manner described above, are often extremely small, ranging from a few microns in diameter to perhaps about 10 microns. While it is possible to effect a good recovery of these fine crystals, we find it advantageous to provide crystals of somewhat larger particle size for ease in handling and prevention of dusting on eventual calcining.

We have found that crystalline $Al_2O_3 \cdot H_2O$ of larger particle sizes can be produced if seed crystals of the alumina monohydrate are added to the partially denitrified, basic aluminum nitrate mass before the hydrothermal digestion. An amount of monohydrate seed crystals equivalent to at least about 35% by weight of free alumina ($Al_2O_3$) is preferred to insure appreciable growth of crystals to make them easily filterable and to avoid dusting in the subsequent calcination step, preferably an amount of seed crystals between about 40% and about 100% by weight of the free $Al_2O_3$ in the basic aluminum nitrate mass to be digested. In this manner alumina monohydrate crystals of average particle size of at least about 15 microns are obtained.

The following specific examples further illustrate our invention. Parts are by weight except as otherwise noted.

EXAMPLE 1

A charge of 2,500 parts of aluminum nitrate nonahydrate crystals $Al(NO_3)_3 \cdot 9H_2O$, was placed into an autoclave equipped with an agitator, vapor outlet and injection tube. The autoclave was closed and the charge was heated to 180°C., thus developing an internal pressure of 50 psig, and causing decomposition of the aluminum nitrate to take place. The vapor outlet was opened, and vaporous decomposition products, $N_2O_5$ and water, were vented as aqueous nitric acid, while agitating the mass and maintaining the temperature and pressure at the indicated level until nitric acid equivalent to 52.6% of the amount theoretically obtainable from the aluminum nitrate in the charge had been removed and collected as 52.3% aqueous nitric acid.

The mass at this stage was still fluid, having a viscosity of 900 centipoises. The vapor outlet was then closed and 2,250 parts of water were introduced into the autoclave, thus providing in the charge a total aluminum concentration of 9.8% (calculated as $Al_2O_3$), and a combined $HNO_3$ concentration of 17.1% based on the total weight of solution.

After dilution of the charge, the autoclave contents were heated at 225°C. for 1 hour under autogenous pressure of 300 psig, during which time a precipitate formed and accumulated. The resulting slurry was removed from the autoclave, filtered under pressure, and the filter cake was washed with 10,000 parts of water. The filtrate, amounting to 12,650 parts, contained 162 parts of aluminum nitrate and 29 parts of $Al_2O_3$, the latter equivalent to 16.2% of the free (i.e. denitrified) alumina in the slurry, indicating that 83.8% of the denitrified alumina produced in the initial denitrification step had precipitated. The washed filter cake was dried at 110°C. The dried cake amounted to 193.5 parts and contained 2.74% residual nitrate as $HNO_3$. It gave an X-ray pattern for alumina monohydrate, $Al_2O_3 \cdot H_2O$, (Boehmite). The filtrate was recycled to a subsequent batch of diluted autoclave liquor for further work-up.

The recovery of $Al_2O_3$ was 44.0% of the total aluminum (calculated as $Al_2O_3$) present in the originally charged $Al(NO_3)_3 \cdot 9H_2O$ denitrified. The recovery of $HNO_3$ based on the total $Al(NO_3)_3 \cdot 9H_2O$ was 52.6%. The total amount of $N_2O_5$ accounted for as aluminum nitrate in the filtrate and as $HNO_3$ in the recovered nitric acid and monohydrate crystals amounted to 99.95% of that originally present in the aluminum nitrate charged indicating only 0.05% of the total $N_2O_5$ was lost as NO and $NO_2$.

EXAMPLE 2

A charge of 1250 parts of $Al(NO_3)_3 \cdot 9H_2O$ was denitrified in the manner described in Example 1 at 180°C. and 50 psig until 50.0% of the theoretically possible $N_2O_5$ had been removed and collected as 51.6% $HNO_3$.

The partially denitrified liquor was diluted in the autoclave with 2630 parts of water, thus providing a total aluminum concentration of 2.7% (calculated as $Al_2O_3$), and a combined $HNO_3$ concentration of 10.0%.

After dilution of the charge the autoclave contents were heated at 190°C. for 4 hours under autogenous pressure of 155 psig. The autoclave was depressurized, the resulting slurry removed and filtered under pressure, yielding a filtrate containing 355 parts aluminum nitrate and 3 parts of $Al_2O_3$, the latter equivalent to 3.5% of the free (i.e. denitrified) alumina in the slurry indicating that 96.5% of the denitrified alumina produced in the initial denitrification step had precipitated. The filter cake amounted to 104 parts and contained 3.0% residual nitrate as $HNO_3$. It gave the characteristic X-ray pattern for alumina monohydrate. Recovery of $Al_2O_3$ was 48.25% of the total aluminum present in the originally charged $Al(NO_3)_3.9H_2O$ and 96.5% of the amount theoretically recoverable from the portion of $Al(NO_3)_3.9H_2O$ denitrified. The recovery of $HNO_3$ based on the total $Al(NO_3)_3.9H_2O$ was 50.0%.

EXAMPLE 3

In the same manner as that described in Example 1 above, 2,500 parts of $Al(NO_3)_3.9H_2O$ was denitrified at 180°C. and 50 psig until 60.0% of the theoretically possible $N_2O_5$ had been removed and collected as 57.6% $HNO_3$. The partially denitrified liquor was diluted in the autoclave with 1550 parts of water thus providing a total aluminum concentration of 5.4% (calculated as $Al_2O_3$) and a combined $HNO_3$ concentration of 20.0%.

The diluted charge was then heated to 235°C. under autogenous pressure of 350 psig for 3/4 hour. The resulting slurry was removed from the autoclave and filtered, yielding 2,280 parts of filtrate containing 565 parts of aluminum nitrate and 0.8 part of free $Al_2O_3$. The filter cake amounted to 336 parts and gave the characteristic X-ray pattern for alumina monohydrate. Recovery of the $Al_2O_3$ was 59.8% of the total aluminum (calculated as $Al_2O_3$) present in the originally charged $Al(NO_3)_3.9H_2O$ equivalent to 99.6% of the amount theoretically recoverable from the portion of $Al(NO_3)_3.9H_2O$ denitrified. Recovery of $HNO_3$ based on total aluminum nitrate charged was 60.0%.

EXAMPLE 4

A charge of 1,850 parts of $Al(NO_3)_3.9H_2O$ was denitrified in the manner described in Example 1, at 180°C. and 50 psig until 50.3% of the theoretically possible $N_2O_5$ had been removed and collected as 57.8% $HNO_3$.

The partially denitrified liquor was diluted in the autoclave with 1,450 parts of water containing 260 parts of washed product cake from Example 1 as seed crystals. The autoclave was closed and the diluted seeded liquor was heated to 200°C. under an autogenous pressure of 250 psig and digested under these conditions for 2 ½ hours. The autoclave was then cooled to zero gauge pressure and the product slurry removed and filtered, and the cake washed with 340 parts of 1% $Al(NO_3)_3.9H_2O$ solution. The solid product was in the form of easily filterable crystals of considerably larger size than those obtained in Example 1 in which no seed crystals were added. The filtrate contained 6.05% aluminum nitrate (calculated as $Al_2O_3$) and 0.12% free $HNO_3$. The combined nitrate was 22.2%. The wet filter cake contained 43.0% $Al_2O_3$ equivalent to 50.3% recovery based on the total $Al(NO_3)_3.9H_2O$ in the original charge and 100% of the amount theoretically recoverable from the portion of $Al(NO_3)_3.9H_2O$ denitrified.

EXAMPLE 5

In the manner described in the foregoing examples, a charge of 4,000 parts of $Al(NO_3)_3.9H_2O$ was denitrified under 50 psig pressure and 180°C. temperature until 33.3% of the $N_2O_5$ had been removed as 45.1% $HNO_3$. The denitrified liquor was diluted with 1,200 parts of water which provided a solution containing 14.6% $Al_2O_3$ and 36.3% combined $HNO_3$, based on the total weight of the solution. The diluted liquor was heated to 160°C. to give a maximum pressure of 50 psig for one hour. The resulting thick slurry was removed from the depressurized autoclave and filtered. The filtrate analyzed 12.5% $Al_2O_3$ and 44.5% $HNO_3$ which represented a change in molar ratio of $Al_2O_3/HNO_3$ from 1:4 in the dilute liquor to 1:5.77 in the filtrate, corresponding to nearly normal (1:6) $Al(NO_3)_3$. The filter cake, after drying at 110°C., contained only 50.4% $Al_2O_3$ with a high $HNO_3$ content of 25.9% equivalent to a molar ratio $Al_2O_3:HNO_3$ of 1:0.83. This indicates that much of the $Al_2O_3$ has precipitated as the dibasic aluminum nitrate $Al(OH)_2 NO_3$, rather than as the desired alumina monohydrate $Al_2O_3.1H_2O$, and that the temperature of 160°C. at which the heating of the dilute denitrified liquor was carried out, is too low to effect complete hydrolytic disproportionation of the basic nitrate to alumina monohydrate.

EXAMPLE 6

A charge of 5400 parts of aluminum nitrate liquor prepared by pressure digestion of a kaolin clay at 170°C. and containing 1420 parts of aluminum nitrate (340 parts $Al_2O_3$ and 1260 parts $HNO_3$), containing 6.3% aluminum calculated as $Al_2O_3$ and .02% iron calculated as $Fe_2O_3$ was concentrated by volatilization of 1,940 parts of water thus producing 3460 parts of a liquor of 9.85% $Al_2O_3$ content. This liquor was placed into an autoclave and heated at 180°C. and 50 psig pressure while venting the vaporous decomposition products. Heating and venting were continued until 50% of the combined $HNO_3$ theoretically obtainable from the aluminum nitrate in the charge had been removed and collected as 31% $HNO_3$, leaving a basic aluminum nitrate in the autoclave.

The partially denitrified liquor produced above was diluted with 1,850 parts of water containing 136 parts of alumina monohydrate as seed. The diluted, seed-containing liquor was heated for 2 hours at 200°C. under pressure of 200 psig to convert the basic aluminum nitrate to alumina monohydrate ($Al_2O_3.H_2O$) and aluminum nitrate. The resulting slurry, containing $Al_2O_3.H_2O$ crystals of approximately 40 microns in diameter was cooled and filtered and the filter cake washed. The resulting 6,760 parts of filtrate and washings contained 710 parts of aluminum nitrate and 15 parts of free $Al_2O_3$ dissolved therein. The 1,400 parts of wet filter cake contained a total of 294 parts of alumina monohydrate of which 158 parts was in excess over the seed crystals charged. The excess alumina monohydrate precipitated represents 46.4% of the alumina charged in the digester liquor or 93.0% of the alumina denitrified. The recovery of nitric values as nitric acid was 50.0% of the nitric acid equivalent in the digest liquor.

The total amount of $N_2O_5$ accounted for as aluminum nitrate in the filtrate and as $HNO_3$ in the recovered nitric acid and in the monohydrate crystals amounted to 99.95% of that originally present in the aluminum nitrate charged, of which 0.5% remain in the monohydrate crystals, and only 0.05% of the total $N_2O_5$ lost as NO and $NO_2$.

A portion of the recovered crystals of $Al_2O_3 \cdot H_2O$ were calcined by heating at 900°C. for one hour, during which time nitric acid vapors were taken off and collected and amounted to only 0.5% based on that originally present in the aluminum nitrate charged. No dust was detectable in these vapors. The resulting calcined $Al_2O_3$ had an average particle size considerably in excess of the micron size of the original crystals and ranged from about 50 microns to about 100 microns.

When the 52.6% denitrified material was recovered as described in Examples 3 or 4 of U.S. Pat. No. 3,366,446, by "flashing" to release the pressure, followed by "drying" at 130°C. for 1 hour and finally by calcining the solidified melt at 420°C. (800°F.) and passing the resulting vapors successively through a caustic absorber for $NO_2$ and a permanganate absorber for NO, the condensate which was collected contained 0.9% of the total alumina carried over into the condensate. This nitric acid condensate (containing $HNO_3$ from the denitrification flashing and calcining steps) contained only 81% of the nitric acid in the charged aluminum nitrate. The $NO_2$ and NO absorbers contained 12.1% of the total original $HNO_3$ as $NO_2$ and 6.9% as NO. A total of 19% of the original $HNO_3$ converted to lower oxides of nitrogen, as compared to only 0.55% in the process of our invention as described above.

EXAMPLE 7

In the manner described in Example 1, a charge of 1000 parts of $Al(NO_3)_3 \cdot 9H_2O)$ was denitrified under 50 psig pressure and 180°C. temperature until 24.5% of the $N_2O_5$ had been removed as 48.3% $HNO_3$. The partially denitrified liquor was diluted with 3,050 parts of water which provided a solution containing a total aluminum concentration of 3.58% calculated as $Al_2O_3$, and 10.0% combined $HNO_3$, based on the total weight of the solution. The diluted liquor was heated to 200°C. thus producing a maximum pressure of 200 psig for 4 hours. The resulting slurry was removed from the depressurized autoclave and filtered. The filtrate analyzed 3.18% $Al_2O_3$ and 10.4% $HNO_3$ which represented a change in molar ratio of $Al_2O_3/HNO_3$ from 1:4.53 in the dilute liquor to 1:5.29 in the filtrate. The resulting 28 parts of dried filter cake contained 19.3 parts $Al_2O_3$, of which 18.5 parts was present as the monohydrate. (The rest was combined with occluded nitrate). The 18.5 parts $Al_2O_3$ represents 13.6% of the 136 parts $Al_2O_3$ charged to the autoclave or 55.5% of the 33.3 parts of denitrified $Al_2O_3$ in the diluted liquor. Recovery of $Al_2O_3$ was thus 13.6% of the total aluminum present in the originally charged $Al(NO_3)_3 \cdot 9H_2O$, and 55.5% of the amount theoretically recoverable from the portion of $Al(NO_3)_3 \cdot 9H_2O$ denitrified.

EXAMPLE 8

A charge of 2000 parts of $Al(NO_3)_3 \cdot 9H_2O$ was denitrified by heating at temperatures between 130° and 140°C. under atmospheric pressure until 50% of the $N_2O_5$ in the charge had been removed and collected as 50% $HNO_3$. The resulting gummy melt was poured into a tray, forming a thin film which was cooled to room temperature (Ca. 25°C). The resulting congealed melt was broken up into small pieces which were transferred to a vessel and carefully heated over a range progressing from about 100°C. to about 200°C. during which the melt slowly powdered and an additional 25% of $N_2O_5$ was recovered and collected as 70% $HNO_3$. The partially denitrified solid thus obtained was charged to an autoclave with 2,100 parts of water, thus providing a total aluminum concentration of 10% calculated as $Al_2O_3$ and a combined $HNO_3$ concentration of 10%. The autoclave was closed and the diluted charge was heated to 200°C. at a pressure of 220 psig for 3 hours. The resulting slurry was removed from the autoclave and filtered, yielding 2,460 parts of filtrate containing 252 parts of aluminum nitrate and 4 parts of free $Al_2O_3$. The filter cake amounted to 214 parts of which 40 parts were combined with occluded nitrate. The 210 parts of $Al_2O_3$ were present as the monohydrate and represented a recovery of 76.5% of the total aluminum in the aluminum nitrate charged and 100% of the aluminum in the partially denitrified material.

EXAMPLE 9

A charge of aluminum nitrate nonahydrate was denitrified at 180°C. and 50 psig pressure until 50.2% of the possible $N_2O_5$ had been removed. Then 50 parts of this partially denitrified material, containing 12.7 parts aluminum calculated as $Al_2O_3$, 23.6 parts of $HNO_3$ and 13.65 parts of water was further denitrified by heating at 420°C. in an agitated flask, while collecting the emitted vapors and analyzing them periodically for parts $HNO_3$ (composed of nitric acid values released as $N_2O_5$ and condensed with water to form $HNO_3$), for $NO_2$ and NO emitted, the $NO_2$ being collected by caustic absorption, the NO in caustic and permanganate.

Results are shown in Table II below.

TABLE II

| Variations in Composition of Nitric Acid Decomposition Products Produced at Different degrees of Denitrification of $Al(NO_3)_3$ | | | |
|---|---|---|---|
| Denitrification % | Parts in Condensate | | |
| | $HNO_3$ | $NO_2$ | NO |
| 50.2 – 65.2 | 7.13 | .01 | 0 |
| 65.2 – 75.8 | 5.01 | .03 | 0 |
| 75.8 – 86.5 | 4.17 | .82 | .05 |
| 86.5 – 99.55 | 2.75 | 2.00 | 1.58 |

It is apparent from Table II that denitrification beyond about 75% results in increasing decomposition of the nitric acid values to lower oxides of nitrogen $NO_2$ and NO at the expense of $N_2O_5$ (recorded as $HNO_3$).

While the above describes the preferred embodiments of our invention, it will be understood that departures can be made therefrom within the scope of the specification and claims.

We claim:

1. In a process for recovering alumina monohydrate and aluminum nitrate from basic aluminum nitrates prepared by melting aluminum nitrate nonahydrate, partially denitrifying said molten aluminum nitrate nonahydrate by heating it to a temperature above its decomposition temperature but not above about 235°C. under superatmospheric pressure of at least about 25 psig and sufficient to maintain said decomposition temperature, while removing gaseous nitric acid decomposition products until between about 45% and about 55% of the $HNO_3$ of the aluminum nitrate nonahydrate has been removed, the steps which comprise 1. adding to a basic aluminum nitrate having the empirical formula

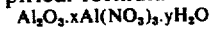

wherein X is a numeral from 0.667 to 6,0 inclusive, and Y is a numeral from 4 to 38 inclusive, about 7.2 moles $H_2O$ to about 28.2 moles $H_2O$ per mole of $NO_3$ in said basic aluminum nitrate to provide an aqueous solution having in solution a nitrate concentration between about 10 percent and about 25 percent by weight calculated as $NO_3$, respectively, (2) heating said diluted solution to a temperature between about 180°C and about 235°C. under autogenous pressure for a period sufficient to convert the basic aluminum nitrate to solid alumina monohydrate and dissolved aluminum nitrate wherein oxides of nitrogen released therefrom are substantially $N_2O_5$, (3) recovering the solid alumina monohydrate by separating the same from the solution, (4) recycling the separated solution to a succeeding aluminum nitrate dentrification step, whereby a steady state is established wherein recovery of both alumina and nitric acid is high, and (5) recovering approximately 99.5% of the $HNO_3$ originally present in said aluminum nitrate nonahydrate.

* * * * *